(12) United States Patent
Rama et al.

(10) Patent No.: US 11,144,373 B2
(45) Date of Patent: Oct. 12, 2021

(54) DATA PIPELINE USING A PLUGGABLE TOPOLOGY CONNECTING COMPONENTS WITHOUT ALTERING CODE OF THE COMPONENTS

(71) Applicant: SAP SE, Walldorf (DE)

(72) Inventors: Harish Kumar Sampangi Rama, Bangalore (IN); Abhradeep Kundu, Bangalore (IN); Amarendu Singh, Bangalore (IN); Venkatesh Iyengar, Bangalore (IN); Sudhakar Bommenahalli Ramamurthy, Bangalore (IN)

(73) Assignee: SAP SE, Walldorf (DE)

( * ) Notice: Subject to any disclaimer, the term of this patent is extended or adjusted under 35 U.S.C. 154(b) by 234 days.

(21) Appl. No.: 16/405,586

(22) Filed: May 7, 2019

(65) Prior Publication Data
US 2020/0356428 A1    Nov. 12, 2020

(51) Int. Cl.
*G06F 9/54* (2006.01)
*G06F 9/445* (2018.01)

(52) U.S. Cl.
CPC .......... *G06F 9/544* (2013.01); *G06F 9/44505* (2013.01)

(58) Field of Classification Search
CPC ............................. G06F 9/544; G06F 9/44505
See application file for complete search history.

(56) References Cited

U.S. PATENT DOCUMENTS

| | | | |
|---|---|---|---|
| 10,534,595 B1 * | 1/2020 | Lisuk | G06F 8/433 |
| 2016/0210721 A1 * | 7/2016 | Taylor | G06T 1/20 |
| 2020/0125540 A1 * | 4/2020 | Thatte | G06F 9/544 |

* cited by examiner

*Primary Examiner* — Tammara R Peyton
(74) *Attorney, Agent, or Firm* — Mintz Levin Cohn Ferris Glovsky and Popeo, P.C.

(57) ABSTRACT

A method, a system, and a computer product for connecting computing components are disclosed. One or more data input and output properties of a data processing component in a plurality of data processing components are determined. At least one of the data input properties and data output properties of the data processing component are configured for connection of the data processing component to another data processing component in the plurality of data processing components in the data processing pipeline using a predetermined data pipeline connection topology. Using the predetermined data pipeline connection topology, the data processing component and another data processing component are dynamically connected using the configured properties.

18 Claims, 8 Drawing Sheets

DATA PIPELINE USING A PLUGGABLE TOPOLOGY CONNECTING COMPONENTS WITHOUT ALTERING CODE OF THE COMPONENTS

TECHNICAL FIELD

This disclosure relates generally to data processing and, in particular, to automatically connecting components of a data pipeline using a pluggable topology.

BACKGROUND

In today's world, computing systems rely on a multitude of computing components or data processing elements for performing of various tasks. Such computing components/elements may be connected in a data pipeline. The data pipeline may connect the components/elements in series, whereby an output of one component/element may serve as an input of the next component/element. In some cases, the components/elements of a pipeline may be executed in parallel and/or in time-sliced manner. A particular computing system may define a particular topology of such components/elements that may be used to determine how execution of a particular function, transaction, element may proceed. However, in the existing topologies of computing systems, it may be difficult to add/modify/remove various components/elements. Thus, there is a need for a way to effectively connect (e.g., add, modify, remove, etc.) computing components and/or processing elements in a computing system.

SUMMARY

In some implementations, the current subject matter relates to a computer implemented method for connecting computing components. The method may include determining one or more data input properties of a data processing component in a plurality of data processing components, determining one or more data output properties of the data processing component, configuring at least one of the data input properties and the data output properties of the data processing component for connection of the data processing component to another data processing component in the plurality of data processing components in the data processing pipeline using a predetermined data pipeline connection topology, and dynamically connecting, using the predetermined data pipeline connection topology, the data processing component and another data processing component using the configured properties.

In some implementations, the current subject matter can include one or more of the following optional features. In some implementations, the data processing component, using the one or more configured data input properties, may receive data from another data processing component in the data processing pipeline.

In some implementations, the data processing component, using the one or more configured data output properties, may provide output to another data processing component in the data processing pipeline.

In some implementations, the data processing component may be connected to another data processing component to receive data output from another data processing component in the data processing pipeline. In some implementations, the data processing component may be connected to another data processing component to provide data output to another data processing component in the data processing pipeline.

In some implementations, the method may also include executing a data flow in the data processing pipeline between connected data processing component and another data processing component, using the one or more configured properties.

In some implementations, the predetermined data pipeline connection topology may include at least one of the following: a diamond connection topology, a tree connection topology, a mesh connection topology, and any combination thereof. The dynamic connection may further include dynamically connecting, using the predetermined data pipeline connection topology, the data processing component and the another data processing component without altering code of the at least one of the data processing component and the another data processing component.

In some implementations, the predetermined data pipeline connection topology may include one or more channels configured to connect the data processing component and another data processing component. The channels may include at least one of the following: an input channel of at least one of data processing component and another data processing component, an output channel of at least one of data processing component and another data processing component, and any combination thereof.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

To address these and potentially other deficiencies of currently available solutions, one or more implementations of the current subject matter relate to methods, systems, articles of manufacture, and the like that can, among other possible advantages, provide an ability for automatically connecting components in a data processing pipeline that may include a pluggable topology.

A data pipeline may be an embedded data processing engine in a computing system (e.g., which may implement Java Virtual Machine (JVM)). The processing engine may be configured to execute various data processing tasks in a software application, application programming interface (API), where tasks may include, but are not limited to data filtering, data transformation, data migration, etc. Some of the data processing tasks may be executed on the fly. In some instances, a data pipeline may include a computing framework that may be configured to operate with large batches of data, tasks, etc. Such computing framework may include reading and writing computing components that may be configured to read/write data from a plurality of data sources, where the data may be presented in different formats. The data pipeline may also include various streaming computing components that may be configured to transform data (e.g., on the fly).

Using a data pipeline, a computing system may be able to convert data to a common format (e.g., a predetermined or specified data format), prepare data for analysis and/or displaying, migrate data between one or more databases, share various data processing logic between software applications, batch computing jobs, and/or application programming interfaces, consume large data files (e.g., variable and/or fixed width, XML, CSV, etc.), as well as perform various other computing tasks. A computing system that includes a data pipeline may provide an application programming interface that may allow a user (e.g., a physical user, a virtual user, a software application, a computing system, etc.) to operate with data, where the API may treat such data in the same fashion regardless of its source, target, format, and/or structure.

In some cases, a data pipeline may operate with or without a particular schema. For example, a data pipeline may process data in a tabular data where each row may have the same schema and each field may have a single value, and/or a hierarchical data where each node may have multiple child nodes and nodes may include single values, array values, and/or other records. Each data flowing through the data pipeline may be follow the same schema or may follow a different structure that may be changed at any place in the pipeline.

A data pipeline may associate metadata to each individual piece of data (e.g., a record, a field, etc.). Metadata may include information identifying a source of the data, who created the data, changes made to the data, viewing restrictions, etc.

Figure 1:
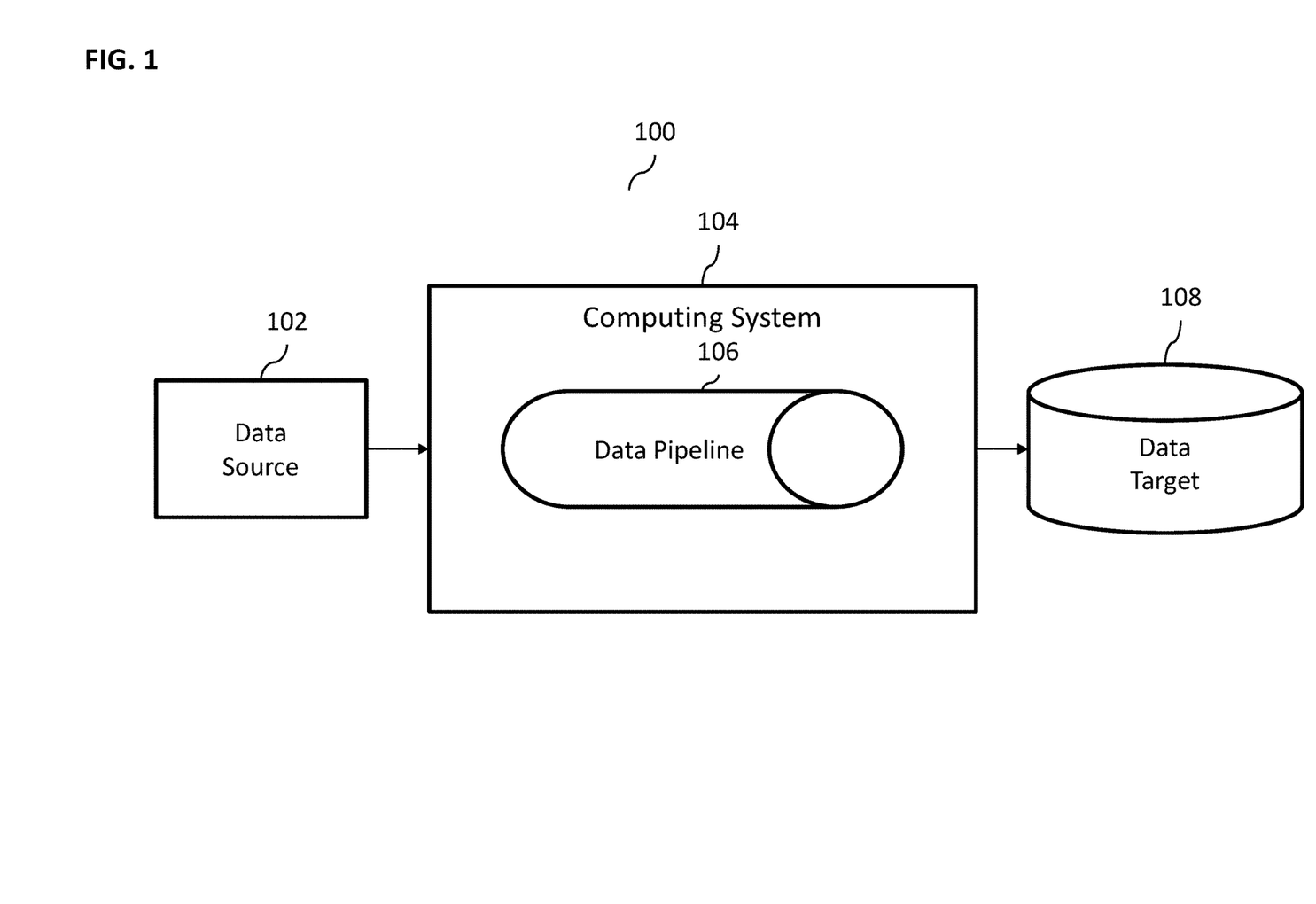
FIG. 1 illustrates an exemplary system that includes a data pipeline, according to some implementations of the current subject matter.

FIG. 1 illustrates an exemplary system 100 that includes a data pipeline, according to some implementations of the current subject matter. The system 100 may include one or more data sources 102, one or more computing system 104 that may include one or more data pipeline(s) 106, and one or more data targets 108. The data source(s) 102, the computing system(s) 104, and the data targets 108 may be communicatively coupled with one another using any type of network, including but not limited to, wired, wireless, and/or a combination of both. The data source(s) 102 may include at least one of the following: computer processors, computing networks, software applications, servers, user interfaces, and/or any combination of hardware and/or software components. Data target(s) 108 may include at least one of the following: databases, storage locations, memory locations, and/or any combination of hardware and/or software components.

The computing system(s) 104 may include any combination of software and/or hardware components and can be configured to receive and execute one or more data pipeline(s) 106 and/or process data from one or more data sources 102 and/or store, migrate, transform, etc. data in one or more data targets 108.

In some implementations, the computing system 102 may be configured to execute a query. Execution of a query may typically require generation of a query plan and/or query execution plan, which may be an ordered set of operations that may be used to access stored data (e.g., access data in a SQL relational database management system). When a query is submitted to a database, a query optimizer may evaluate various plans for executing the query and can return what it considers the best possible plan. In some cases, database users and/or administrators may manually examine and/or configure the plans generated by the query optimizer to obtain better results/performance.

In some implementations, the computing system(s) 104 may be configured to use one or more computing components (not shown in FIG. 1) to execute various data processing tasks (e.g., in response to a query). Execution of data processing tasks may require different combinations of data processing or computing components. To accommodate such different combinations of computing components, the current subject matter system may provide a "pluggable" mechanism that may seamlessly interact with other computing components in accordance with a data pipeline flow of the computing system 104. Such interaction may be executed without altering the computing components themselves and/or their interfaces and their communication endpoints.

In some implementations, the current subject matter may provide a flow based model of computing components whereby each computing component may read the flow configuration and compute the communication end points to which it has to "listen" to (which may correspond to an input channel for that computing component). The computing component may also compute a standardized output channel for its own output, which, in turn, may be consumed (or be an input to) by immediate downstream computing components.

Figure 2A:
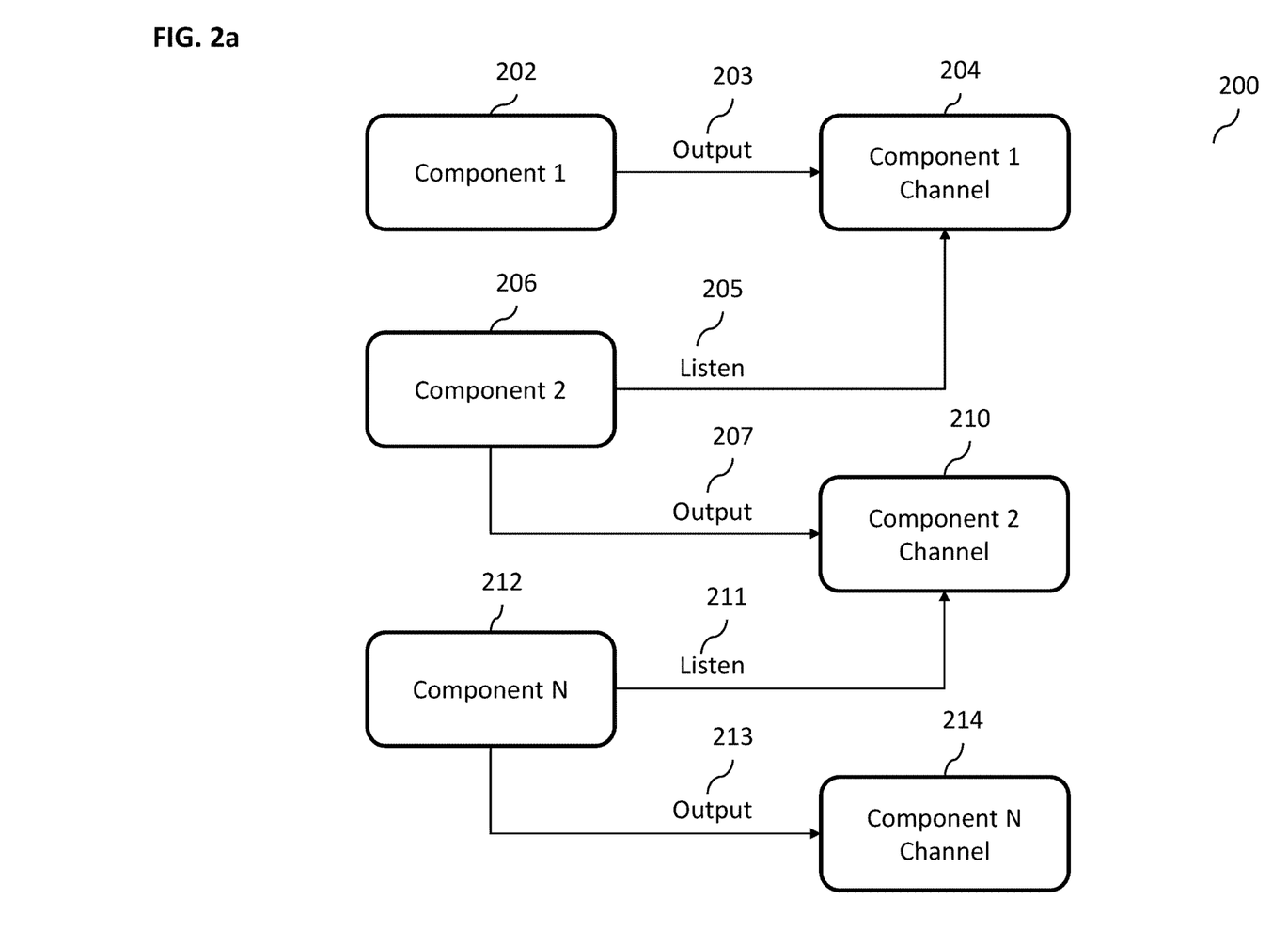
FIG. 2*a* illustrates an exemplary computing component data pipeline, according to some implementations of the current subject matter.

FIG. 2a illustrates an exemplary computing component data pipeline 200, according to some implementations of the current subject matter. The computing component data pipeline 200 may include one or more computing components 1, 2, ... N 202, 206, ... 212. The computing components may include, for example, computer processors, computing networks, software applications, servers, user interfaces, and/or any combination of hardware and/or software components.

As shown in FIG. 2a, the computing component 1 202 may generate an output 203 and provide it to the computing component 1 channel 204, which may be consumed or listened to (at 205) by the computing component 2 206. The computing component 2 206 may generate an output 207 that may be provided to the computing component 2 channel 210 for consumption by the next downstream computing component (e.g., computing component N 212). Similarly, the computing component N 212 may generate its own output 213 that may be provided to a component N channel 214. Eventually, the output of the last computing component (e.g., computing component N 212) may be provided to a data target (e.g., data target 108 shown in FIG. 1).

The flow in the data pipeline 200 may be implemented using the following exemplary code (e.g., JSON):

```
"Flow": {
"Component1": ["Component Specific Property"],
"Component2": ["Component Specific Property"],
"ComponentN": ["Component Specific Property"],
...
}
```

Figure 2B:
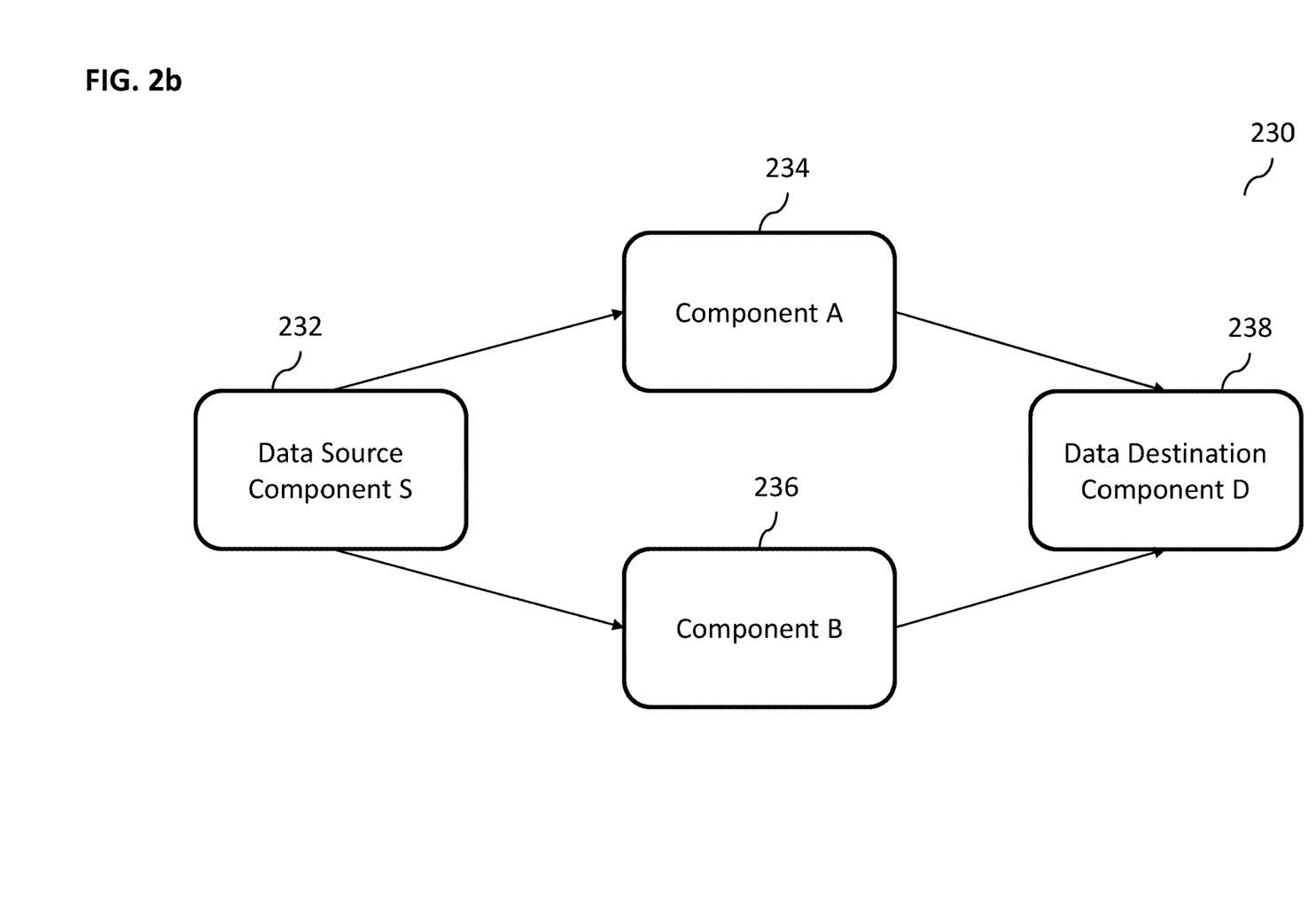
FIG. 2b illustrates another exemplary implementation of a pluggable computing component data pipeline, according to some implementations of the current subject matter.

FIG. 2b illustrates another exemplary implementation of a pluggable computing component data pipeline 230, according to some implementations of the current subject matter. The data pipeline 230 may include the following topology. A source computing component "S" 232 may feed data to computing components "A" and "B" 234, 236. Computing component "A" 234 and computing component "B" 236 may feed data to destination computing component "D" 238. For this topology, the requirement may be to determine a channel where computing component "S" 232 may write to, the channels where computing components "A" and "B" 234, 236 should read from and write to and finally the channel where computing component "D" may need to read data from and optionally, where it may write to.

The flow configuration of the above data pipeline may be represented as follows (e.g., in JSON format):

```
{
"flows": [
{
"flow1": [
{
"S": {
"name": "S1",
"url": "NA"
}
},
{
"A": {
"name": "A1",
"url": "NA"
}
},
{
"D": {
"name": "D1",
"url": "NA"
}
}
],
```

```
"flow2": [
{
"S": {
"name": "S1",
"url": "NA"
}
},
{
"B": {
"name": "B1",
"url": "NA"
}
},
{
"D": {
"name": "D1",
"url": "NA"
}
}
]
}
]
}
```

Using the above scheme, the current subject matter may provide a flexible topology without any code changes. A configuration change may be to modify the topology or the data flow in any required pipeline. Using the above scheme, the current subject matter may easily "detach" (e.g., remove, delete, etc.) or "attach" (e.g., add) a computing component. The current subject matter may be implemented to construct any topology (e.g., diamond, tree, mesh, etc.). Further, different types of computing components of different computing systems may be connected using the above methodology.

Figure 3:
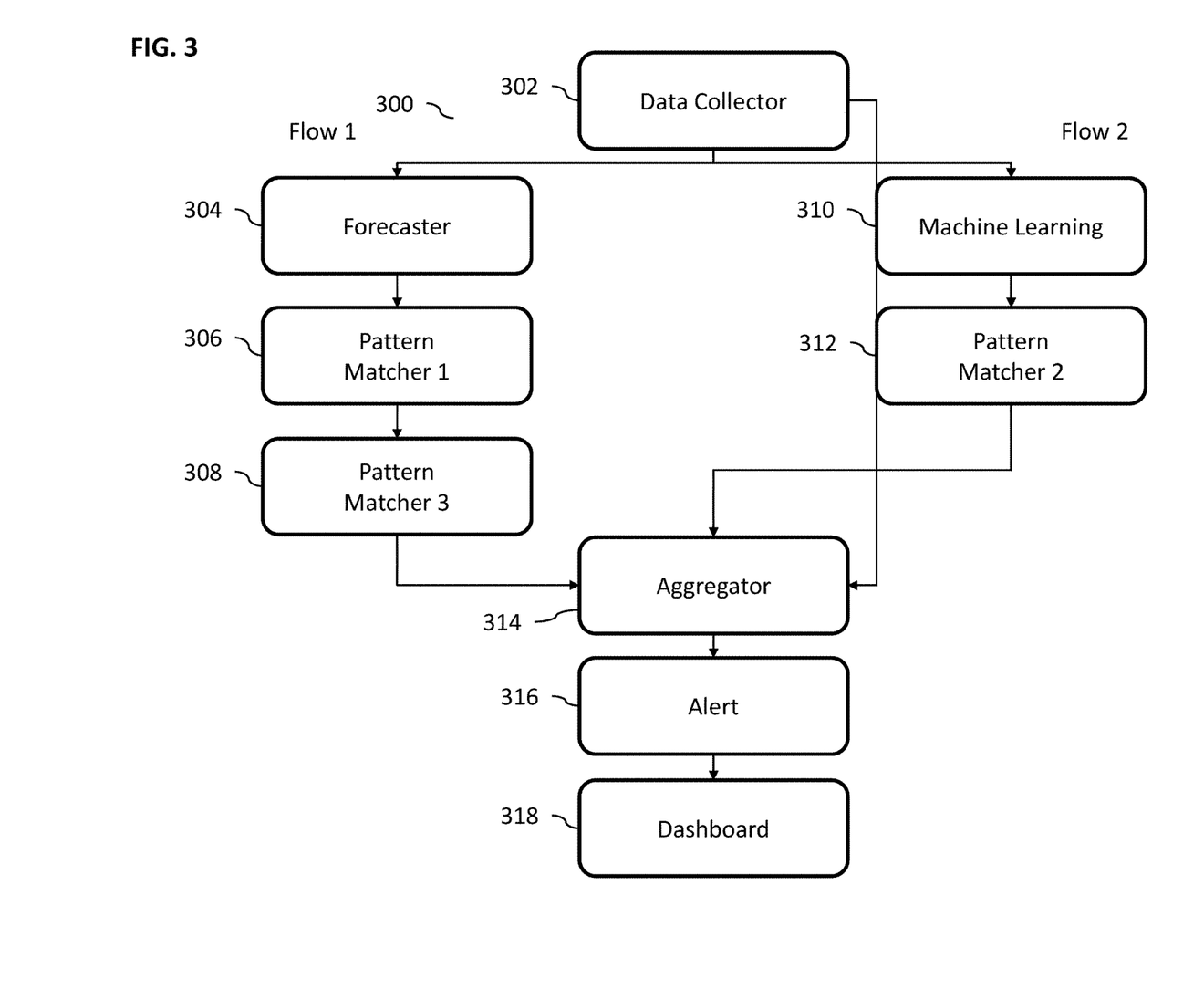
FIG. 3 illustrates another exemplary data pipeline system, according to some implementations of the current subject matter.

FIG. 3 illustrates another exemplary data pipeline system 300, according to some implementations of the current subject matter. The system 300 may be implemented in a financial system that may perform various forecasting functions, data aggregation, alerts, generate dashboards, etc.

The system 300 may include a data collector (DC) 302 (e.g., a data source) that may feed various data to a forecaster (FC) component 304. Once processed by the forecaster component 304, the data may be provided to data pattern matcher 1 (PM1) component 306, which in turn, may output it to another pattern matcher 3 (PM3) component 308 to perform further data pattern matching.

The data collector 302 may also provide data to a machine learning (ML) component 310. The component 310 may execute various machine learning functions on the provided data and the results of such machine learning may be provided to pattern matcher 2 (PM2) component 312.

Outputs of the component 308 and component 312 along with the data received from the data collector 302 (e.g., on-demand context data) may be provided to the aggregator (AG) component 314. The component 314 may perform various data aggregation functions and provide its output to the alert (AL) component 316, which may be configured to generate various alerts. A dashboard component 318 may be a final destination of the system 300.

The data pipeline 300 shown in FIG. 3 may be represented using the following code (e.g., in JSON format):

```
{
"flows": [
{
"flow1": [
{
```

-continued

```
        "DC": {
            "name": "dc1",
            "url": "_"
        }
    },
    {
        "FC": {
            "name", "fc1",
            "url": "_"
        }
    },
    {
        "PM": {
            "name", "pm1"
            "url": "_"
        }
    },
    {
        "PM": {
            "name": "pm2",
            "url": "_"
        }
    },
    {
        "AG": {
            "name": "ag1",
            "url": "_"
        }
    },
    {
        "AL": {
            "name". "al1",
            "url": "_"
        }
    }
    ]
},
{
    "flow2": [
    {
        "DC": {
            "name": "dc1",
            "url": "_"
        }
    },
    {
        "ML": {
            "name": "ml1",
            "url": "_"
        }
    },
    {
        "PM": {
            "name": "pm3",
            "url": "_"
        }
    },
    {
        "AG": {
            "name": "ag1",
            "url": "_"
        }
    },
    {
        "AL": {
            "name": "al1",
            "url": "_"
        }
    }
    ]
    }
    ]
}
```

"Flow 1" in the above code is represented by connections between components 302, 304, 306, and 308. "Flow 2" is represented by connection between components 310, 312.

Connections or channels between computing components 302-318 may be used to "listen" for an output transmitted from a previous component in the data pipeline and/or transmit an output to another component. Knowledge of the channels (e.g., input, output) and specific component(s)' properties may allow for a quick configuration and/or connection of components, regardless of the origin of such components or the type and/or format of data that they are providing and/or require. The components may be easily configured to be plugged into a particular pipeline.

In some implementations, the current subject matter can be implemented in various in-memory database systems, such as a High Performance Analytic Appliance ("HANA") system as developed by SAP SE, Walldorf, Germany. Various systems, such as, enterprise resource planning ("ERP") system, supply chain management system ("SCM") system, supplier relationship management ("SRM") system, customer relationship management ("CRM") system, and/or others, can interact with the in-memory system for the purposes of accessing data, for example. Other systems and/or combinations of systems can be used for implementations of the current subject matter. The following is a discussion of an exemplary in-memory system.

Figure 4:
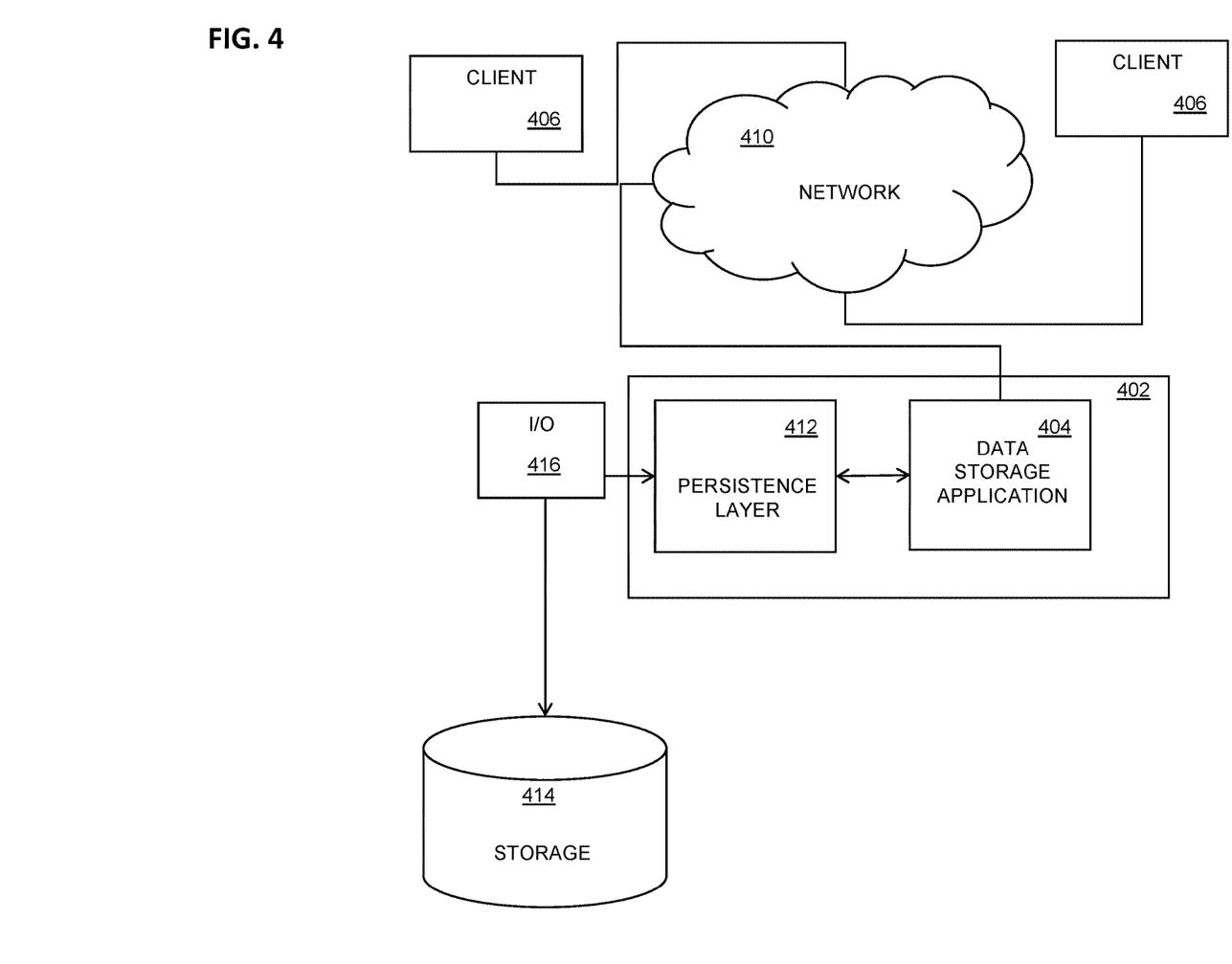
FIG. 4 is a diagram illustrating an exemplary system including a data storage application, according to some implementations of the current subject matter.

FIG. 4 illustrates an exemplary system 400 in which a computing system 402, which can include one or more programmable processors that can be collocated, linked over one or more networks, etc., executes one or more modules, software components, or the like of a data storage application 404, according to some implementations of the current subject matter. The data storage application 404 can include one or more of a database, an enterprise resource program, a distributed storage system (e.g. NetApp Filer available from NetApp of Sunnyvale, Calif.), or the like.

The one or more modules, software components, or the like can be accessible to local users of the computing system 402 as well as to remote users accessing the computing system 402 from one or more client machines 406 over a network connection 410. One or more user interface screens produced by the one or more first modules can be displayed to a user, either via a local display or via a display associated with one of the client machines 406. Data units of the data storage application 404 can be transiently stored in a persistence layer 412 (e.g., a page buffer or other type of temporary persistency layer), which can write the data, in the form of storage pages, to one or more storages 414, for example via an input/output component 416. The one or more storages 414 can include one or more physical storage media or devices (e.g. hard disk drives, persistent flash memory, random access memory, optical media, magnetic media, and the like) configured for writing data for longer term storage. It should be noted that the storage 414 and the input/output component 416 can be included in the computing system 402 despite their being shown as external to the computing system 402 in FIG. 4.

Data retained at the longer term storage 414 can be organized in pages, each of which has allocated to it a defined amount of storage space. In some implementations, the amount of storage space allocated to each page can be constant and fixed. However, other implementations in which the amount of storage space allocated to each page can vary are also within the scope of the current subject matter.

Figure 5:
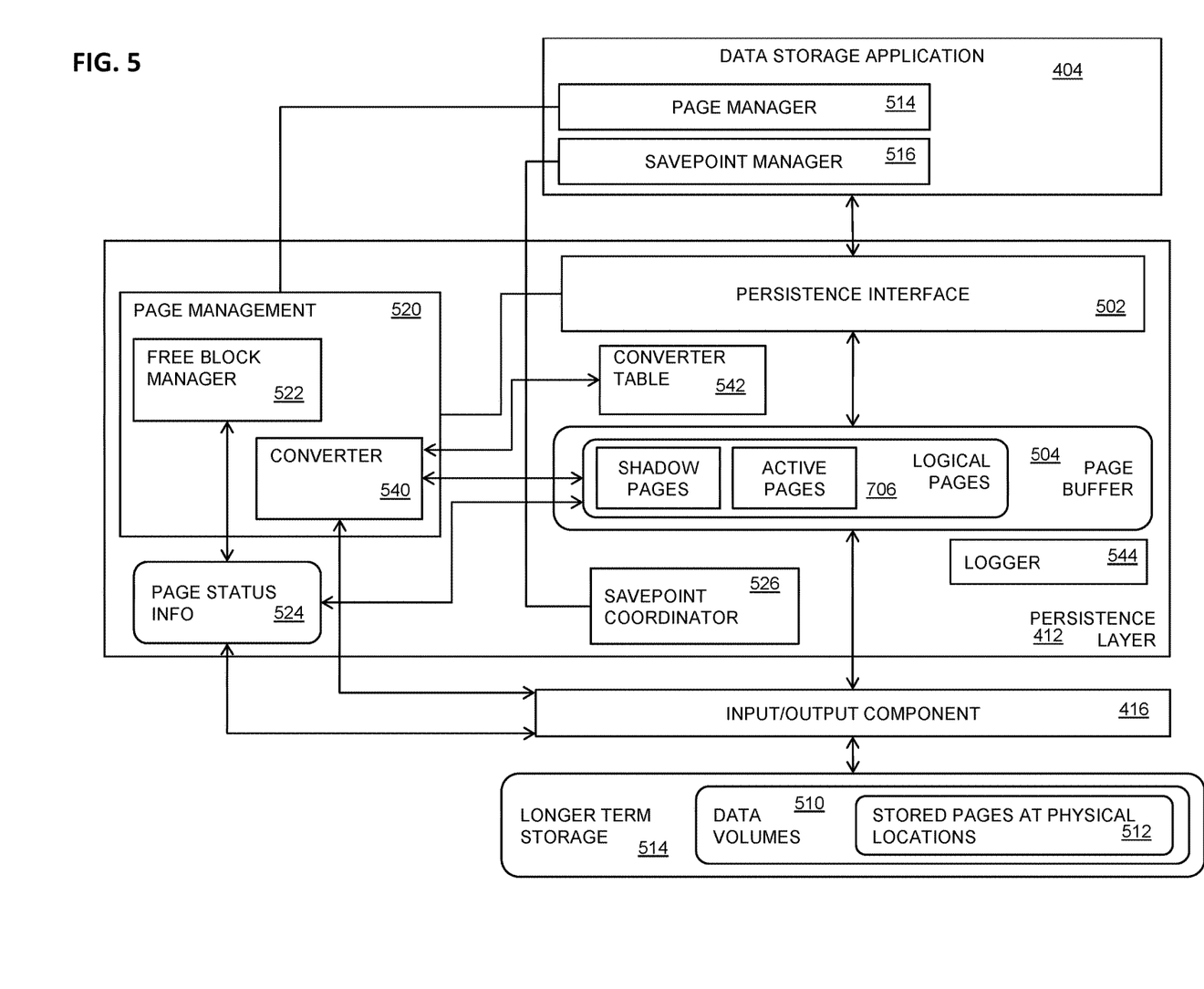
FIG. 5 is a diagram illustrating details of the system of FIG. 4.

FIG. 5 illustrates exemplary software architecture 500, according to some implementations of the current subject matter. A data storage application 404, which can be implemented in one or more of hardware and software, can include one or more of a database application, a network-attached storage system, or the like. According to at least some implementations of the current subject matter, such a data storage application 404 can include or otherwise interface with a persistence layer 412 or other type of memory buffer, for example via a persistence interface 502. A page buffer 504 within the persistence layer 412 can store one or more logical pages 506, and optionally can include shadow pages, active pages, and the like. The logical pages 506 retained in the persistence layer 412 can be written to a storage (e.g. a longer term storage, etc.) 414 via an input/output component 416, which can be a software module, a sub-system implemented in one or more of software and hardware, or the like. The storage 414 can include one or more data volumes 510 where stored pages 512 are allocated at physical memory blocks.

In some implementations, the data storage application 404 can include or be otherwise in communication with a page manager 514 and/or a savepoint manager 516. The page manager 514 can communicate with a page management module 520 at the persistence layer 412 that can include a free block manager 522 that monitors page status information 524, for example the status of physical pages within the storage 414 and logical pages in the persistence layer 412 (and optionally in the page buffer 504). The savepoint manager 516 can communicate with a savepoint coordinator 526 at the persistence layer 412 to handle savepoints, which are used to create a consistent persistent state of the database for restart after a possible crash.

In some implementations of a data storage application 404, the page management module of the persistence layer 412 can implement a shadow paging. The free block manager 522 within the page management module 520 can maintain the status of physical pages. The page buffer 504 can include a fixed page status buffer that operates as discussed herein. A converter component 540, which can be part of or in communication with the page management module 520, can be responsible for mapping between logical and physical pages written to the storage 414. The converter 540 can maintain the current mapping of logical pages to the corresponding physical pages in a converter table 542. The converter 540 can maintain a current mapping of logical pages 506 to the corresponding physical pages in one or more converter tables 542. When a logical page 506 is read from storage 414, the storage page to be loaded can be looked up from the one or more converter tables 542 using the converter 540. When a logical page is written to storage 414 the first time after a savepoint, a new free physical page is assigned to the logical page. The free block manager 522 marks the new physical page as "used" and the new mapping is stored in the one or more converter tables 542.

The persistence layer 412 can ensure that changes made in the data storage application 404 are durable and that the data storage application 404 can be restored to a most recent committed state after a restart. Writing data to the storage 414 need not be synchronized with the end of the writing transaction. As such, uncommitted changes can be written to disk and committed changes may not yet be written to disk when a writing transaction is finished. After a system crash, changes made by transactions that were not finished can be rolled back. Changes occurring by already committed transactions should not be lost in this process. A logger component 544 can also be included to store the changes made to the data of the data storage application in a linear log. The logger component 544 can be used during recovery to replay operations since a last savepoint to ensure that all operations are applied to the data and that transactions with a logged "commit" record are committed before rolling back still-open transactions at the end of a recovery process.

With some data storage applications, writing data to a disk is not necessarily synchronized with the end of the writing transaction. Situations can occur in which uncommitted changes are written to disk and while, at the same time, committed changes are not yet written to disk when the writing transaction is finished. After a system crash, changes made by transactions that were not finished must be rolled back and changes by committed transaction must not be lost.

To ensure that committed changes are not lost, redo log information can be written by the logger component 544 whenever a change is made. This information can be written to disk at latest when the transaction ends. The log entries can be persisted in separate log volumes while normal data is written to data volumes. With a redo log, committed changes can be restored even if the corresponding data pages were not written to disk. For undoing uncommitted changes, the persistence layer 412 can use a combination of undo log entries (from one or more logs) and shadow paging.

The persistence interface 502 can handle read and write requests of stores (e.g., in-memory stores, etc.). The persistence interface 502 can also provide write methods for writing data both with logging and without logging. If the logged write operations are used, the persistence interface 502 invokes the logger 544. In addition, the logger 544 provides an interface that allows stores (e.g., in-memory stores, etc.) to directly add log entries into a log queue. The logger interface also provides methods to request that log entries in the in-memory log queue are flushed to disk.

Log entries contain a log sequence number, the type of the log entry and the identifier of the transaction. Depending on the operation type additional information is logged by the logger 544. For an entry of type "update", for example, this would be the identification of the affected record and the after image of the modified data.

When the data application 404 is restarted, the log entries need to be processed. To speed up this process the redo log is not always processed from the beginning. Instead, as stated above, savepoints can be periodically performed that write all changes to disk that were made (e.g., in memory, etc.) since the last savepoint. When starting up the system, only the logs created after the last savepoint need to be processed. After the next backup operation the old log entries before the savepoint position can be removed.

When the logger 544 is invoked for writing log entries, it does not immediately write to disk. Instead it can put the log entries into a log queue in memory. The entries in the log queue can be written to disk at the latest when the corresponding transaction is finished (committed or aborted). To guarantee that the committed changes are not lost, the commit operation is not successfully finished before the corresponding log entries are flushed to disk. Writing log queue entries to disk can also be triggered by other events, for example when log queue pages are full or when a savepoint is performed.

With the current subject matter, the logger 544 can write a database log (or simply referred to herein as a "log") sequentially into a memory buffer in natural order (e.g., sequential order, etc.). If several physical hard disks/storage devices are used to store log data, several log partitions can be defined. Thereafter, the logger 544 (which as stated above acts to generate and organize log data) can load-balance writing to log buffers over all available log partitions. In some cases, the load-balancing is according to a round-robin distributions scheme in which various writing operations are directed to log buffers in a sequential and continuous manner. With this arrangement, log buffers written to a single log segment of a particular partition of a multi-partition log are not consecutive. However, the log buffers can be reordered from log segments of all partitions during recovery to the proper order.

As stated above, the data storage application 404 can use shadow paging so that the savepoint manager 516 can write a transactionally-consistent savepoint. With such an arrangement, a data backup comprises a copy of all data pages contained in a particular savepoint, which was done as the first step of the data backup process. The current subject matter can be also applied to other types of data page storage.

Figure 6:
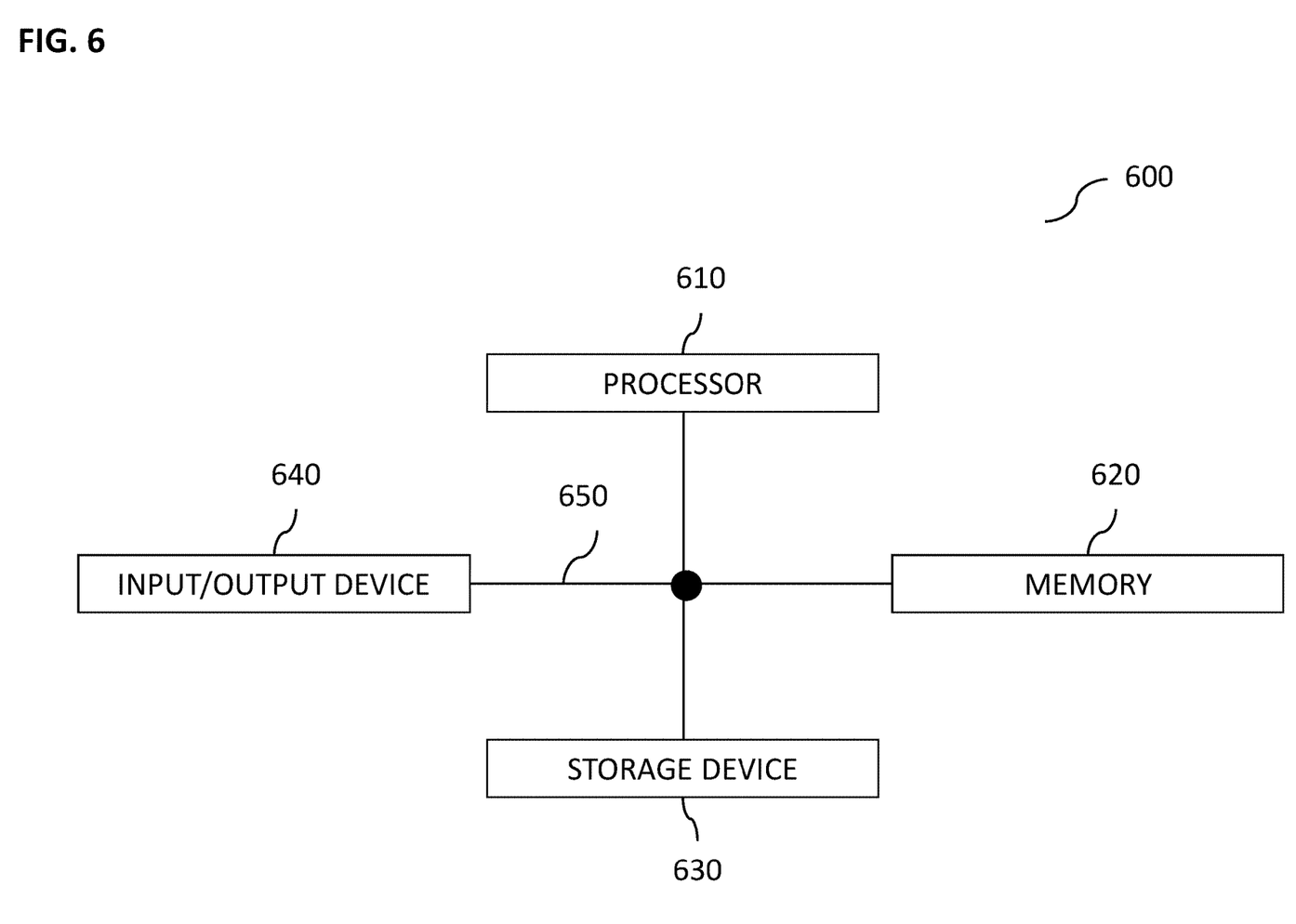
FIG. 6 is an exemplary system, according to some implementations of the current subject matter.

In some implementations, the current subject matter can be configured to be implemented in a system 600, as shown in FIG. 6. The system 600 can include a processor 610, a memory 620, a storage device 630, and an input/output device 640. Each of the components 610, 620, 630 and 640 can be interconnected using a system bus 650. The processor 610 can be configured to process instructions for execution within the system 600. In some implementations, the processor 610 can be a single-threaded processor. In alternate implementations, the processor 610 can be a multi-threaded processor. The processor 610 can be further configured to process instructions stored in the memory 620 or on the storage device 630, including receiving or sending information through the input/output device 640. The memory 620 can store information within the system 600. In some implementations, the memory 620 can be a computer-readable medium. In alternate implementations, the memory 620 can be a volatile memory unit. In yet some implementations, the memory 620 can be a non-volatile memory unit. The storage device 630 can be capable of providing mass storage for the system 600. In some implementations, the storage device 630 can be a computer-readable medium. In alternate implementations, the storage device 630 can be a floppy disk device, a hard disk device, an optical disk device, a tape device, non-volatile solid state memory, or any other type of storage device. The input/output device 640 can be configured to provide input/output operations for the system 600. In some implementations, the input/output device 640 can include a keyboard and/or pointing device. In alternate implementations, the input/output device 640 can include a display unit for displaying graphical user interfaces.

Figure 7:
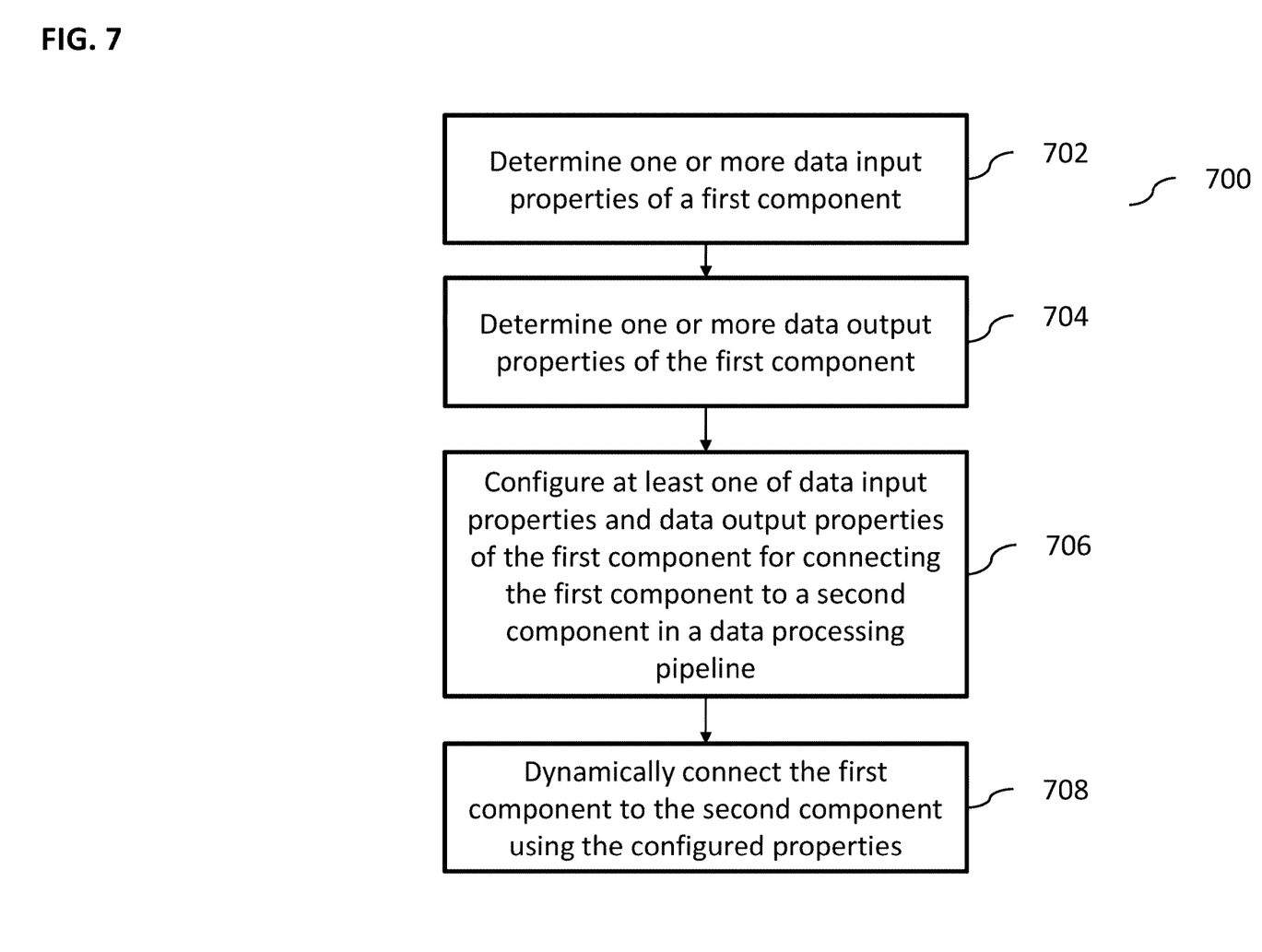
FIG. 7 is an exemplary method, according to some implementations of the current subject matter.

FIG. 7 illustrates an exemplary method 700 for connecting components in a data processing pipeline, according to some implementations of the current subject matter. At 702, one or more data input properties of a data processing component (e.g., a first component) in a plurality of data processing components may be determined. The data input properties may define how the first data component, once connected in the data pipeline, may "listen" to or receive an output from another component in the plurality of components in the data processing pipeline (e.g., in a particular format, etc.). At 704, one or more data output properties of the first component may also be determined. The data output properties may define how (e.g., in which specific format) the first component, once connected in the data pipeline to other components, may generate an output and provide it to the next component downstream in the data pipeline. At 706, at least one of the data input properties and data output properties of the first component may be configured for connection of the first component to another (e.g., a second) data processing component in the plurality of data processing components in the data processing pipeline using a predetermined data pipeline connection topology (e.g., diamond, tree, mesh, etc.). At 708, the first component may be dynamically connected to the second component using one or more of the configured properties using the predetermined data pipeline connection topology.

In some implementations, the current subject matter can include one or more of the following optional features. In some implementations, the data processing component, using the one or more configured data input properties, may receive data from another data processing component in the data processing pipeline.

In some implementations, the data processing component, using the one or more configured data output properties, may provide output to another data processing component in the data processing pipeline.

In some implementations, the data processing component may be connected to another data processing component to receive data output from another data processing component in the data processing pipeline. In some implementations, the data processing component may be connected to another data processing component to provide data output to another data processing component in the data processing pipeline.

In some implementations, the method may also include executing a data flow in the data processing pipeline between connected data processing component and another data processing component, using the one or more configured properties.

In some implementations, the predetermined data pipeline connection topology may include at least one of the following: a diamond connection topology, a tree connection topology, a mesh connection topology, and any combination thereof. The dynamic connection may further include dynamically connecting, using the predetermined data pipeline connection topology, the data processing component and the another data processing component without altering code of the at least one of the data processing component and the another data processing component.

In some implementations, the predetermined data pipeline connection topology may include one or more channels configured to connect the data processing component and another data processing component. The channels may include at least one of the following: an input channel of at least one of data processing component and another data processing component, an output channel of at least one of data processing component and another data processing component, and any combination thereof.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
    determining one or more data input properties of a data processing component in a plurality of data processing components;
    determining one or more data output properties of the data processing component;
    configuring at least one of the one or more data input properties and the one or more data output properties of the data processing component for connection of the data processing component to another data processing component in the plurality of data processing components in the data processing pipeline using a predetermined data pipeline connection topology; and
    dynamically connecting, using the predetermined data pipeline connection topology, the data processing component and another data processing component using the one or more of configured properties and without altering code of the at least one of the data processing component and the another data processing component.

2. The method according to claim 1, wherein the data processing component, using the one or more configured data input properties, receives data from another data processing component in the data processing pipeline.

3. The method according to claim 1, wherein the data processing component, using the one or more configured data output properties, provides output to another data processing component in the data processing pipeline.

4. The method according to claim 1, wherein the data processing component is connected to another data processing component to receive data output from another data processing component in the data processing pipeline.

5. The method according to claim 1, wherein the data processing component is connected to another data processing component to provide data output to another data processing component in the data processing pipeline.

6. The method according to claim 1, further comprising executing a data flow in the data processing pipeline between connected data processing component and another data processing component, using the one or more configured properties.

7. The method according to claim 1, wherein the predetermined data pipeline connection topology includes at least one of the following: a diamond connection topology, a tree connection topology, a mesh connection topology, and any combination thereof.

8. The method according to claim 1, wherein the predetermined data pipeline connection topology includes one or more channels configured to connect the data processing component and the another data processing component, wherein the one or more channels include at least one of the following: an input channel of at least one of data processing component and the another data processing component, an output channel of at least one of data processing component and the another data processing component, and any combination thereof.

9. A system comprising:
at least one programmable processor; and
a non-transitory machine-readable medium storing instructions that, when executed by the at least one programmable processor, cause the at least one programmable processor to perform operations comprising:
determining one or more data input properties of a data processing component in a plurality of data processing components;
determining one or more data output properties of the data processing component;
configuring at least one of the one or more data input properties and the one or more data output properties of the data processing component for connection of the data processing component to another data processing component in the plurality of data processing components in the data processing pipeline using a predetermined data pipeline connection topology; and
dynamically connecting, using the predetermined data pipeline connection topology, the data processing component and another data processing component using the one or more of configured properties and without altering code of the at least one of the data processing component and the another data processing component.

10. The system according to claim 9, wherein the data processing component, using the one or more configured data input properties, receives data from another data processing component in the data processing pipeline.

11. The system according to claim 9, wherein the data processing component, using the one or more configured data output properties, provides output to another data processing component in the data processing pipeline.

12. The system according to claim 9, wherein the data processing component is connected to another data processing component to receive data output from another data processing component in the data processing pipeline.

13. The system according to claim 9, wherein the data processing component is connected to another data processing component to provide data output to another data processing component in the data processing pipeline.

14. The system according to claim 9, wherein the operations further comprise executing a data flow in the data processing pipeline between connected data processing component and another data processing component, using the one or more configured properties.

15. The system according to claim 9, wherein the predetermined data pipeline connection topology includes at least one of the following: a diamond connection topology, a tree connection topology, a mesh connection topology, and any combination thereof.

16. The system according to claim 9, wherein the predetermined data pipeline connection topology includes one or more channels configured to connect the data processing component and the another data processing component, wherein the one or more channels include at least one of the following: an input channel of at least one of data processing component and the another data processing component, an output channel of at least one of data processing component and the another data processing component, and any combination thereof.

17. A computer program product comprising a non-transitory machine-readable medium storing instructions that, when executed by at least one programmable processor, cause the at least one programmable processor to perform operations comprising:
determining one or more data input properties of a data processing component in a plurality of data processing components;
determining one or more data output properties of the data processing component;
configuring at least one of the one or more data input properties and the one or more data output properties of the data processing component for connection of the data processing component to another data processing component in the plurality of data processing components in the data processing pipeline using a predetermined data pipeline connection topology; and
dynamically connecting, using the predetermined data pipeline connection topology, the data processing component and another data processing component using the one or more of configured properties and without altering code of the at least one of the data processing component and the another data processing component.

18. The computer program product according to claim 17, wherein the operations further comprise executing a data flow in the data processing pipeline between connected data processing component and another data processing component, using the one or more configured properties.

* * * * *